United States Patent Office 3,315,468
Patented Apr. 25, 1967

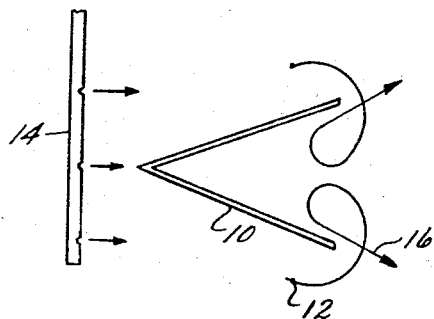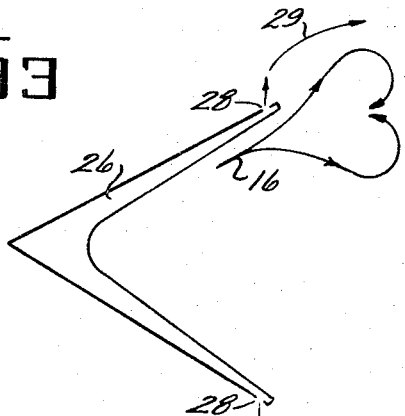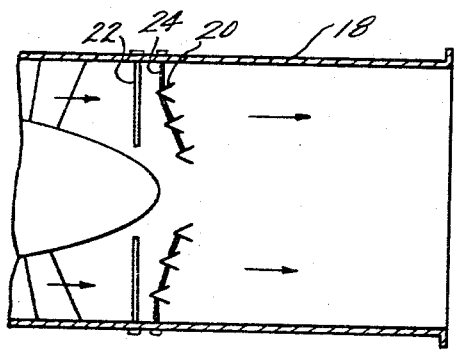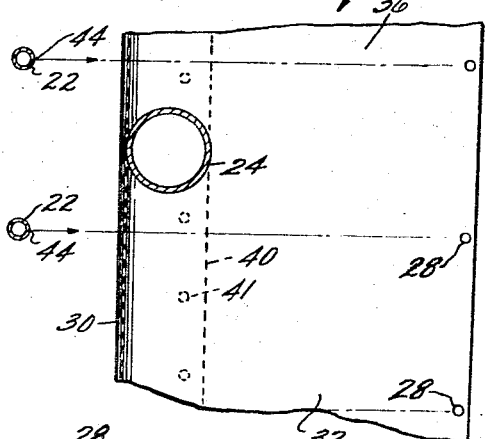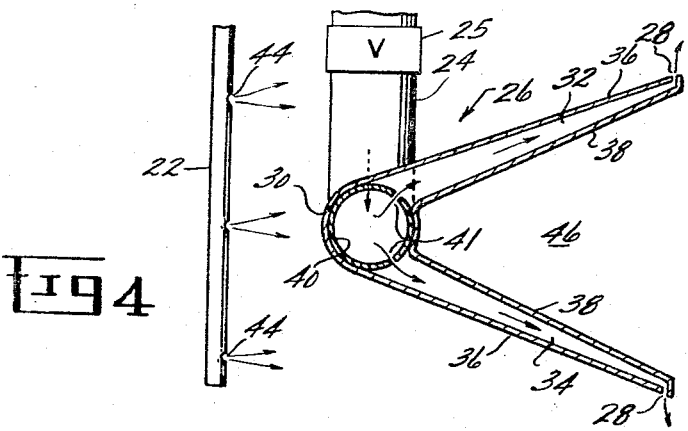

3,315,468
COOLED FLAMEHOLDER ASSEMBLY
John W. Vdoviak, Cincinnati, Ohio, assignor to General Electric Company, a corporation of New York
Filed Oct. 1, 1965, Ser. No. 492,039
3 Claims. (Cl. 60—39.72)

The present invention relates to a cooled flameholder assembly and, more particularly, to a flameholder assembly that is adapted for use in high temperature afterburners.

The present generation of high temperature jet engines in many applications requires the use of an afterburner or augmentor for very high thrust. While augmentation and afterburners have been primarily useful in military applications, the advent of the supersonic transport has developed a need for afterburner operation also. One of the difficulties in the high tempeatures required in afterburner operation is the problem of long life of the parts. No presently known materials are adequate to use for flameholders and also provide for the long life that is needed in commercial engines. One approach to long life is to cool the flameholder by bleed air from the compressor. The difficulty is that this has a high penalty on the cycle performance. Taking air from the compressor is equivalent to losing thrust since the bled air bypasses the turbine thus requiring a higher pressure difference across the turbine. It then becomes necessary, if compressor air is to be used for cooling purposes, that there should be a further return for the air used. Thus, it becomes desirable that the cooling air perform two functions. It must cool the flameholder in order to provide the long life necessary in commercial applications and secondly, it should improve the afterburner efficiency when the cooling air is being used so as to compensate for the cycle penalty of bleeding the compressor of the air. It then must be used properly in an adequate flameholder assembly so that the normal combustion stability of the flameholder is not upset. At least part of the loss due to bleeding air around the turbine may be regained by an improvement in the afterburner efficiency, so there can be a tradeoff between the bleed air loss for an improvement in the reheat efficiency in the augmentor portion of the engine.

The use of air cooled flameholders wherein the air is introduced either to enhance or have no effect on performance is not new. Further, where the air used to cool the flameholders has been injected substantially at right angles to the gas flow in a sheet-like form it is known that this has the disadvantage in that the penetration of the air is low and the combustion stability of the flameholder is poor. Furthermore, there is dilution of the fuel-air mixture in the flameholder recirculation zone when the air is injected in a sheet. This dilution cannot be tolerated if the increase in combustion efficiency is to be obtained.

The object of the present invention is to provide a flameholder assembly that is espeically useful in high outlet temperature afterburning engines with the assurance of a long life component.

A further object is to provide such a flameholder assembly which performs the functions of both cooling the flameholder and improving the afterburner efficiency.

Another object is to provide a flameholder assembly which avoids the sheet-like injection and the consequent low penetration and poor stability.

Briefly stated, there is provided a flameholder assembly that is primarily for use in an afterburner or a duct burner turbofan engine and which is disposed within the combustion chamber having gas flow. The assembly comprises a V-shaped member in cross-section which has its apex directed upstream in the usual manner. Several of these in a concentric circular ring arrangement will normally be used. Each of the V-cross section members is made up of a pair of legs that diverge in the downstream direction and each leg is constructed of a pair of spaced formed walls to form a hollow separated V-structure with diverging legs. Support means, in the form of tubes, may be connected to the chamber and preferably at the apex of the V to direct cooling air into the hollow legs. The legs are provided with spaced apertures on the outer trailing edge surface which apertures direct the cooling fluid normal to the gas flow at separately spaced points. The aperture spacing is such that the normal flameholding process occurs between apertures thereby maintaining stability. Fuel injection means is provided upstream of the apex of the flameholder to form part of the assembly to inject fuel towards and in substantial alignment with the apertures to avoid dilution effects.

While the specification concludes with claims particularly pointing out and distinctly claiming the subject matter which is regarded as the invention, it is believed that the invention will be better understood from the following description taken in connection with the accompanying drawings, in which:

FIGURE 1 is a diagrammatic cross-sectional view of a typical V-flameholder illustrating the operation thereof;

FIGURE 2 is a partial cross-sectional view of a typical afterburner as used on a jet engine;

FIGURE 3 is a partial view of a general cross-sectional V-structure concept of the invention showing the flow effects;

FIGURE 4 is a cross-sectional view of a flameholder assembly of the invention; and FIGURE 5 is a partial top view of FIGURE 4 illustrating the spaced apertures.

Referring first to FIGURE 1, there is shown a conventional V-gutter flameholder 10 which works on the basis that there is a flow of fuel 12 that flows from upstream injector 14 and forms a combustible fuel and air mixture by the time it reaches the annulus around the outer portion of the V-gutter legs. A flame or fire is held on the downstream end or in the wake of the legs and ignites the fuel flow 12 which, because of the blockage of the flameholder, follows the recirculating path shown by the arrows and recirculates to burn to completion as it passes out arrow 16 to form an igniting flame for the succeeding fuel 12 that approaches. Before the particle of flow 12 is completely burned it exchanges energy with a new incoming particle of fuel-air mixture and ignites it. This fundamental process must not be adversely affected by the cooling air if an efficiency gain is to be obtained. It will be seen that adding air jets in a particular manner to this conventional structure in combination with other structural differences to be described, will provide better flow effects as seen in FIGURE 3 by action of the air jets to improve flame propagation and efficiency without disturbing the flameholding recirculation pattern between the jets.

It has been customary to provide a sheet-like flow 16 but this, in effect, puts up cold uncarbureted air in a very critical spot in the flameholder so that the flameholder is unstable. It is unstable in combustion tending to go out and consequently is low in efficiency and poor in stability.

Flameholders are normally provided in the tail pipe or afterburner of the conventional jet engine and this environment is shown in FIGURE 2. In this figure, a tail pipe 18 may be an afterburner. It will be apparent that the flameholder assembly is applicable to other environments such as the duct flow in a turbofan engine or applications wherein high temperature burning is encountered and where there is a pressure differential for the injection of the air as will be apparent. Disposed in generally concentric closed rings across the tail pipe is a series of V-shaped flameholders 20 which, in assembly, include upstream injectors 22 all in the well known manner.

As previously stated, because high temperature application and long life are desired and no known materials are available to withstand the environment encountered for the required operating life, it is necessary to bleed low temperature air from the compressor and use it for cooling the flameholders 20. The flameholders are held in concentric rings by a suitable support 24 that may be connected at the apexs at one end and that is connected to the combustion chamber or tail pipe 18 at the other end as shown in FIGURE 2. Valve means 25 may be added to cut the airflow in non-afterburning operation. Because bleeding air around the turbine represents a loss in the cycle efficiency it is necessary to recoup as much of this loss as possible. To this end, there is provided a cooled flameholder of a general closed triangular or delta shape as shown in FIGURE 4. Flow effects from this general shaped flameholder are shown in FIGURE 3 where widely spaced apertures 28 emit air jets 29 to change the pattern of flow as shown to improve the mixing and flame propagation. The flameholder 26 of FIGURE 4 is provided with the widely spaced apertures 28 and is hollow to provide for airflow normal to the gas flow as shown by the arrows. More specifically, reference to FIGURE 4 shows that the V-shaped flameholder 26 has an apex 30 directed upstream against the gas flow shown by the hollow arrow and a pair of spaced legs 32 and 34 that diverge and are directed downstream as shown. In order to cool these legs spaced walls 36 and 38 are used and formed to provide hollow legs that are separated as shown. These spaced walls may be suitably formed to control the air velocity within the hollow leg portion although any specific shape is not pertinent to the invention described. While any air distribution means may be used, it may be convenient to have a tube 40 with openings 41 or equivalent within the apex and the tube is supplied by the connected supports 24 that are in turn connected to the combustion chamber as described above. Thus, the incoming bleed air may be metered for velocity control through the hollow legs 32 and 34 of the flameholder to direct the cooling air through the legs.

In order to avoid the sheet-like discharge with its poor penetration and dilution effects and to provide for adequate penetration and mixing the coolant air is introduced in jets normal to the main air stream. Each outer surface of wall 36 has the spaced apertures 28 preferably at the trailing edge on the outer surface of the V legs as shown in FIGURE 5. These apertures are disposed to direct the cooling air or fluid substantially normal to the gas flow as shown by the arrows in FIGURE 4. The concentration of the air into slender jets provides for reduced resistance and improved penetration which has been well demonstrated. It should be noted that cooling of the legs takes place over the entire circumferential length while injection takes place only at the apertures at discrete spaced points. In addition to avoiding the dilution effect of a sheet-like injection and still maintain penetration and good stability, it is necessary also that good fuel-air mixing take place. To this end, there is provided an upstream injector 22 that is disposed to inject fuel through suitable openings 44 toward the apertures 42 and substantially in alignment with these apertures as shown in FIGURE 5. This provides good penetration by the air stream jets and good mixing by entrainment so that ignition of the fuel-air stream occurs along the whole periphery of the flameholder. The injection of the fuel into the air stream from the apertures 42 avoids the fuel dilution and still permits spreading so that a good uniform flow occurs at the trailing edge of the flameholder in the areas between the apertures. Thus, collecting the cooling air and exiting it only at the apertures and directing the fuel in alignment with the air jets from the apertures 42 results in a higher concentration of fuel at the air jets 42 to overcome the leaning or dilution effect that normally occurs in the conventional arrangement. In other words, the fuel injection towards apertures 42 provides good uniform overall mixing whereas fuel injection between the apertures only would result in localized leanness at the apertures. Additional fuel injection occurs between the apertures but it is important that it also occur in alignment with the apertures as described.

The result of the arrangement of the flameholder assembly is an increase in the combustion efficiency in the afterburner. Tests have indicated the reheat efficiency is increased by the arrangement described. The combustion or reheat efficiency is the actual temperature rise in the afterburner divided by the ideal or theoretical temperature rise and this is increased by the described arrangement as a tade-off for the loss in cycle efficiency due to the bleeding of the air from the compressor upstream of the turbine. Of course, the loss is not completely recouped but part of it is by an increase in combustion efficiency. This can be very important in supersonic transport engines because a large portion of the mission may be performed on reheat operation.

It will be apparent that the hollow flameholder could use a mixture of fuel and air but, for the purposes herein, only air has been described as passing through the hollow legs of the V-shaped flameholder. It is important that the cross-section of the V-shaped member provide for the internal region 46 if the full recirculation and penetration required is to be obtained and any general delta shape or V-cross section of the type shown in FIGURES 3 and 4 will suffice. Further, it is desired to avoid any sheet-like issuance of the cooling air in order to maintain the proper penetration for mixing and good stability which is not obtainable in a sheet discharge. Thus, the spaced apertures properly directed and aligned as disclosed herein are required to achieve these ends.

While there have been described preferred forms of the invention, obvious equivalent variations are possible in light of the above teachings. It is therefore to be understood that within the scope of the appended claims, the invention may be practiced otherwise than as specifically described, and the claims are intended to cover such equivalent variations.

I claim:

1. A flameholder assembly disposed within a combustion chamber having a gas flow therethrough comprising,
    a series of concentric circular rings of V-cross section,
    tubular support means connected to said chamber and said rings,
    each said ring having an apex directed upstream and legs diverging downstream and each leg having spaced formed walls to provide hollow separated and diverging legs,
    said support means being connected to the apex to direct cooling air into said legs,
    spaced apertures on the outer trailing edge surface of each leg,
    said apertures being disposed to direct the cooling fluid normal to the gas flow, and
    fuel injection means disposed upstream of the apexes to inject fuel towards said apertures and in alignment therewith.

2. A flameholder assembly disposed within a combustion chamber having a gas flow therethrough comprising,
    a V-shaped member in cross-section having its apex directed upstream and legs directed downstream,
    said member including spaced walls to form hollow separated legs,
    said V-shaped flameholder is circular and closed upon itself,
    support means connected to said member to direct cooling air into said legs,
    apertures spaced along at least one trailing edge of said legs on the outer surface of the V to direct said cooling air into the gas flow at separately spaced points, and fuel injection means upstream of the flameholder to inject fuel substantially in alignment with said apertures.

3. Apparatus as in claim 2 wherein:

said apertures are disposed to direct said cooling flow substantially normal to the gas flow.

References Cited by the Examiner

UNITED STATES PATENTS 2,771,743 11/1956 Lovesey _____ 60—39.72
2,912,825 11/1959 Blackman _____ 60—39.72

MARK NEWMAN, *Primary Examiner.*

RALPH D. BLAKESLEE, *Examiner.*